United States Patent
Winter et al.

(10) Patent No.: US 7,543,107 B2
(45) Date of Patent: Jun. 2, 2009

(54) METHOD AND APPARATUS FOR UPDATING DATA ON DISK STORAGE MEDIUM

(75) Inventors: Marco Winter, Hannover (DE); Uwe Janssen, Seelze (DE); Wolfgang Klausberger, Hannover (DE); Stefan Kubsch, Hohnhorst (DE); Dietmar Hepper, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 205 days.

(21) Appl. No.: 10/584,744

(22) PCT Filed: Nov. 22, 2004

(86) PCT No.: PCT/EP2004/013241

§ 371 (c)(1),
(2), (4) Date: Jun. 26, 2006

(87) PCT Pub. No.: WO2005/069300

PCT Pub. Date: Jul. 28, 2005

(65) Prior Publication Data

US 2007/0192535 A1    Aug. 16, 2007

(30) Foreign Application Priority Data

Jan. 6, 2004    (DE)    ................. 10 2004 001 207

(51) Int. Cl.
*G06F 12/00* (2006.01)
(52) U.S. Cl. ........................................ 711/112
(58) Field of Classification Search ........ 711/112
See application file for complete search history.

(56) References Cited

U.S. PATENT DOCUMENTS

2005/0157599 A1 * 7/2005 Kiyama et al. .......... 369/30.03

FOREIGN PATENT DOCUMENTS

| CA | 2279119 | 1/2001 |
| EP | 1486979 | 12/2004 |
| WO | WO 03/079359 | 9/2003 |

* cited by examiner

*Primary Examiner*—Kevin L Ellis
(74) *Attorney, Agent, or Firm*—Robert D. Shedd; Joseph J. Opalach; Reitseng Lin

(57) ABSTRACT

The use of disk-assisted, dynamic databases is to be optimized. To this end, provision is made for new data intended to update an old stock of data to have a second index, relating to the new data, generated for them, and for said second index to be stored on the disk storage medium as a supplement to the first index relating to the old stock of data. This allows the number of write access operations to the disk storage medium to be reduced. This is particularly advantageous for optical media, whose useful life can be increased as a result.

18 Claims, 1 Drawing Sheet

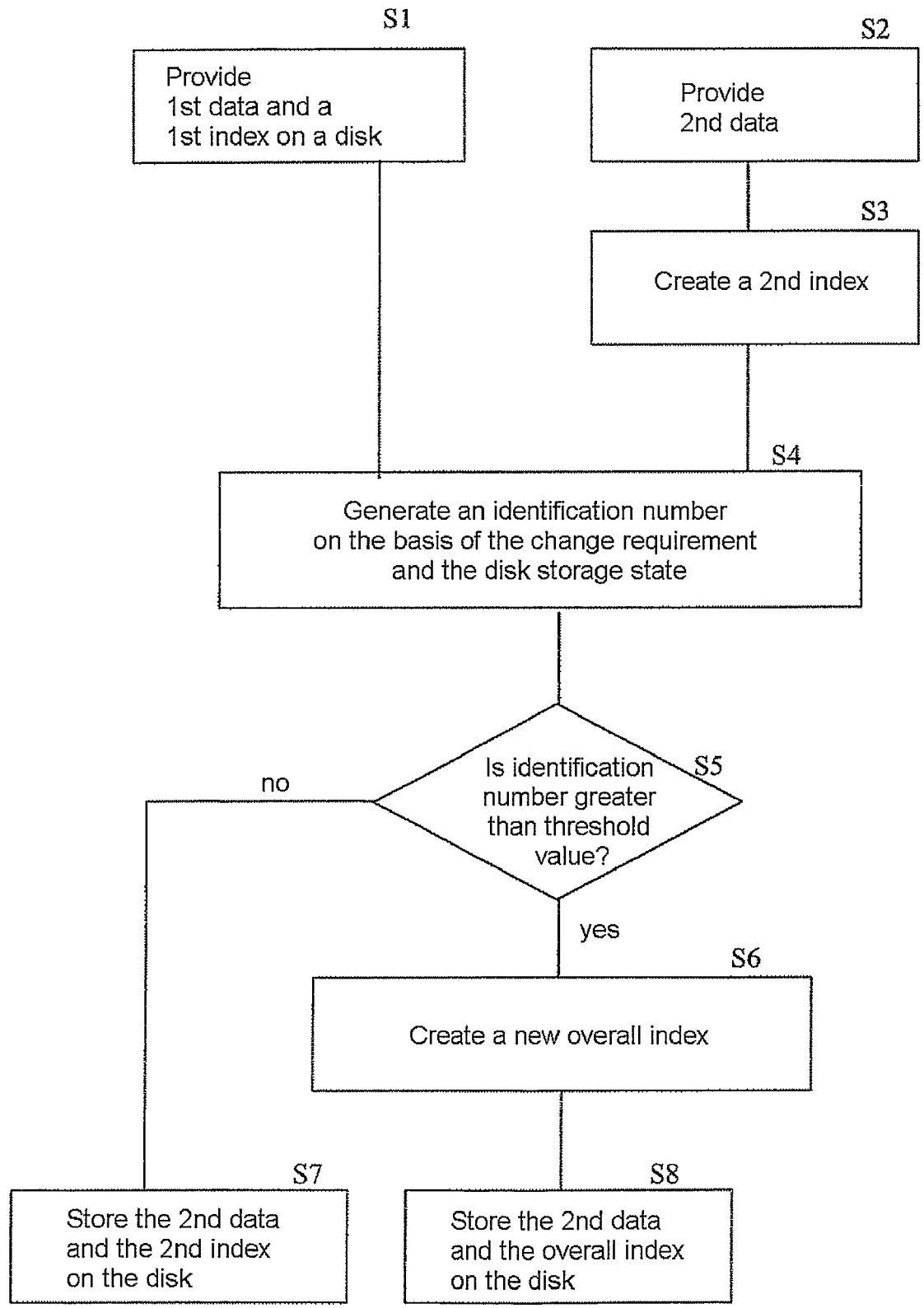

METHOD AND APPARATUS FOR UPDATING DATA ON DISK STORAGE MEDIUM

This application claims the benefit, under 35 U.S.C. § 365 of International Application PCT/EP04/013241, filed Nov. 22, 2004, which was published in accordance with PCT Article 21(2) on Jul. 28, 2005 in English and which claims the benefit of German patent application No. 102004001207.5, filed Jan. 6, 2004.

FIELD OF THE INVENTION

The present invention relates to a method for updating first data, which have an associated first index, on a disk storage medium by storing second data, which update the stock of data in the first data, on the disk storage medium, creating a second index and storing the second index on the disk storage medium. The present invention also relates to a corresponding apparatus for storing data and to a corresponding disk storage medium.

BACKGROUND OF THE INVENTION

Database systems (DBMS Database Management System) access a stock of data. This stock of data is typically stored on a hard disk. In many cases, the data are also stored in a ROM, as is the case with a voice database T9 for mobile radio telephones, for example. In addition, by way of example, telephone books are stored on optical disks, such as CD-ROMs or DVD-ROMs, to some extent.

However, storing a dynamic database on an optical medium is currently avoided. The reason for this is that the read heads for optical media have very long skip times, particularly when the starting point and the destination of the skip are at a great radial distance from one another, and an optical medium allows only a limited number of rewrite cycles in comparison with a hard disk.

The stock of data in a database is frequently provided with an index for optimizing search operations. There are a number of options for accessing an index:

1. Load the index into the main memory (e.g. DRAM) and access it there,
2. Leave the index on the disk and load it into the main memory when required and use it,
3. Search the index on the disk,
4. Buffer-store the index on a hard disk; load corresponding index into the main memory when required and search it, or
5. Buffer-store the index on a hard disk; search the corresponding index on a hard disk directly when required.

The first variant requires a very large number of expensive main memories. This variant is therefore seldom feasible. The second variant is more realistic, particularly when there are a large number of index lists or indices. The third variant saves main memory, but is also the slowest variant.

The fourth variant is a supporting variant in which appropriate index lists are stored temporarily on a hard disk (if present) in order to ensure faster access. Similarly, the fifth variant makes it possible to implement the search entirely on the hard disk.

Particular restrictions apply to an optical, writable disk in comparison with a hard disk.

An optical disk requires a very long time to skip from an arbitrary sector to another arbitrary sector (up to 1 second).

However, the continuous reading-in of sectors is in orders of magnitude similar to that for current hard disks.

The number of times that it is possible to rewrite to a sector is limited (between 1000 and 100 000 times, depending on media type).

Disks such as DVD and Blu-ray protect sectors by means of "ECC" (Error Correction Code). In this case, 16 (DVD) or 32 (Blu-ray) sectors are combined to form a block (ECC block) and are provided with a corresponding additional code. This means that an ECC block can only ever be read and written in full, regardless of whether just one byte of a sector is to be accessed or the entire ECC block.

SUMMARY OF THE INVENTION

The object of the present invention is thus to optimize the database use on disk storage media.

The invention achieves this object by means of a method for updating first data, which have an associated first index, on a disk storage medium by storing second data, which update the stock of data in the first data, on the disk storage medium, creating a second index and storing the second index on the disk storage medium, where the second index is associated exclusively with the second data and is stored on the disk storage medium as a supplement to the first index.

The invention also provides an apparatus for storing data on a disk storage medium, having a writing device for writing first data and second data, which update the stock of data in the first data, to the disk storage medium and for writing a first index relating to the first data to the disk storage medium, a signal processing device for creating the first index, where the signal processing device may also be used to create a second index relating exclusively to the second data, and the writing device may be used to write the second index to the disk storage medium as a supplement to the first index.

The above object is also achieved by a disk storage medium having first data stored thereon, second data stored thereon which update the stock of data in the first data, and a first index, stored thereon, relating to the first data, and also a second index which relates exclusively to the second data and is stored on the disk storage medium as a supplement to the first index.

This provides a way of usefully implementing a dynamic index for a dynamic database on an optical medium too. Advantageously, the index for the dynamic database is not replaced upon every change, but rather in the event of small changes is extended merely by the changes. Only when there is a particular level of alteration is the entire index replaced. This reduces the number of write access operations to an optical medium, which means that the useful life of an optical disk can be increased.

Preferably, the disk storage medium comprises an optical, rewritable disk, such as a writable CD or DVD. These are available inexpensively as a storage medium with high storage capacity.

The second index should be stored radially as close as possible to the first index. Ideally, it is written directly next to the first index. If write operations to the disk have taken place in the meantime, however, it may be that second or updated data have already been set down after the first index. In this case, the second index should then be written to the next free storage location of sufficient size, which means that a skip from the first index to the second index is as small as possible. This is because shorter skips on the optical disk can be performed much more quickly than longer ones. The small spacing between the two indices, or the fact that they are written directly next to one another, thus allows the access speed to the index to be increased, because normally both indices need to be sought during a search operation. It goes without saying that the second index may also be stored before the first index, provided that storage space is available. This has advantages particularly when certain search strategies require only the second index to be searched for the changes or updates.

In addition, the second index should be stored in fragmented form. This also has the advantage that skips are avoided when reading, and hence the access speed can be increased.

Stocks of data are normally updated at regular intervals. In specific terms, this means that the second data are updated by third data. In this case, the third data updating the stock of data in the second data may be stored on the disk storage medium, and a third index relating to the second and third data may be written over the second index. This means that the second index is discarded and a completely new change index is created and stored. As compared with the strategy in which a third index is stored next to the second index, this has the advantage that just two indices need to be used and hence the search speed is increased.

It the changes to the stock of data in the first data are very comprehensive, it may be useful to create and store a new overall index for the entire stock of data, including the changes. So as to have a criterion for the decision, it is possible to introduce an identification number which characterizes a property of the disk storage medium and/or its relationship to the second or third data and which is compared with a prescribable threshold value. The comparison may then be used to establish whether a second or third index or a new overall index relating to all of the data stored on the disk storage medium needs to be created. This means that criteria such as memory requirement, read-in time, number of rewrite cycles and the like may be taken into account.

In certain cases, it may be beneficial to combine elements of the second and third indices, so that the identification number undershoots the prescribable threshold value. This is the case particularly if one of the two indices were very small and hence combination allows a skip by the read head to be avoided.

Preferably, the threshold value is variable and is automatically matched to the state of the disk storage medium. In this way, it is possible to take account of the number of rewrite cycles which are still available.

BRIEF DESCRIPTION OF THE DRAWING

The present invention will now be explained in more detail using the appended drawing, which schematically shows a flow chart for an inventive method for updating a database.

FIG. 1 shows a flow diagram of an exemplary embodiment of the inventive method

DETAILED DESCRIPTION OF THE INVENTION

The exemplary embodiment outlined in more detail below represents a preferred embodiment of the present invention.

The five index handling variants presented the outset do not absolutely require the index to be stored cohesively. However, all variants and particularly the third variant should have the index available at least essentially cohesively on the disk. This is so as not to slow down the reading-in or scanning of the index list from the disk unnecessarily. This principle also applies to the inventive method.

Updating a stock of data requires a special index generation process. The index generation process essentially proceeds as follows when an index is already on the disk as a starting point and is stored on the disk cohesively (cf. step s1 in the FIGURE).

The (actual) stock of data now changes, for example because the user is putting new data or second data into the database (cf. step S2). This means that new data are available which need to be included in the index list. This would alter the index list. So as not to have to recreate and store the entire index list at this point, only the change to the current list is stored (cf. steps S3 and S7). Upon the next read access operation to the index, the old index list (first index) is thus read and then also the change information in the index list (second index).

If the change information (second index) is small (e.g. <1 MB), then additionally reading it takes only a little more time. What is important in this context is that firstly the change information (second index) is situated radially close to the old index list (first index) and that this change information is also stored as cohesively as possible in order to keep down the number of skips on the optical medium. By way of example, storing a further index change (third index) may simply involve replacing a previous index change (second index), i.e. the new change also covers changes which have already been made. This reduces the number of skips when reading the index list and their changes.

By ascertaining an identification number (step S4) and comparing it with a threshold value (step S5), it is then possible to ascertain the point after which a change should result in the index list being stored completely afresh (step S8) and cohesively (as cohesively as possible).

When ascertaining the identification number (step S4), it is possible to include the following criteria, for example.

The memory requirement for all changes which have been made and are new (second, third index etc.) for the respective index list.

The estimated read-in time for all changes (second, third index etc.): time for skipping and reading the sectors of the change and possibly time for scanning changes, respectively.

The total free memory which is still available on the disk.

The number of times that sectors which are currently already free have already been rewritten; that is to say the higher this number the higher the threshold value limit should be set.

If the identification number exceeds the threshold value, which is checked in step S5, the following procedures are recommended:

Is it possible to undershoot the threshold value limit again, for example if one or more already existing changes (second index) are combined in the new change (third index) and the memory taken up by the old changes introduced (second index) is freed? If so, choose this procedure (not shown in the FIGURE).

If no method has been found for undershooting the threshold value, regenerate the index list (step S6) and free memory for the old index list (first index) together with memory for all changes (second and third index). Next, store the new index list as cohesively as possible (step S7).

The threshold value may be a fixed variable or is ascertained in a similar manner to the identification number on the basis of the state of the plate. By way of example, the identification number may assess the time for reading in the index or indices, and the threshold value may instead be calculated from the number of times that the medium has already been overwritten, the memory which is still available on the disk and the degree of fragmentation of the disk. Alternatively, there may be a comparison of how high the gain (time saving for the read-in/rewrite stress for the medium) would be if the index list were to be stored again, as compared with the situation in which only a change would be stored.

In line with the invention, a method is thus presented in which the number of write access operations to the disk can be minimized when required through special storage of the index list by storing a change index. In this way, it is possible to increase the useful life of an optical disk, in particular, significantly. In this case, a slightly reduced search speed is generally of little consequence.

The invention claimed is:

1. A method for updating first data, which have an associated first index, on a disk storage medium by
storing second data, which update the stock of data in the first data, on the disk storage medium,
creating a second index and
storing the second index on the disk storage medium, wherein
the second index is associated exclusively with the second data and is stored on the disk storage medium as a supplement to the first index.

2. The method as claimed in claim 1, wherein the disk storage medium is an optical, rewritable disk with a limited number of storage cycles.

3. The method as claimed in claim 1, wherein the second index is stored radially as close as possible to the first index.

4. The method as claimed in claim 1, wherein the second index is stored in unfragmented form.

5. The method as claimed in claim 1, wherein third data updating the stock of data in the second data are stored on the disk storage medium, and a third index relating to the second and third data is written over the second index.

6. The method as claimed in claim 1, wherein an identification number which characterizes a property of the disk storage medium and/or the latter's relationship to the second or third data is ascertained and is compared with a prescribable threshold value, so that the comparison defines whether a second or third index is used or a new overall index relating to all of the data stored on the disk storage medium is created.

7. The method as claimed in claim 6, wherein elements of the second and third indices are combined, so that the prescribable threshold value is undershot.

8. The method as claimed in claim 6, wherein the prescribable threshold value is dependent on a state of the disk storage medium.

9. An apparatus for storing data on a disk storage medium, having
a writing device for writing first data and second data, which update the stock of data in the first data, to the disk storage medium and for writing a first index relating to the first data to the disk storage medium,
a signal processing device for creating the first index, wherein
the signal processing device may also be used to create a second index relating exclusively to the second data, and
the writing device may be used to write the second index to the disk storage medium as a supplement to the first index.

10. The apparatus as claimed in claim 9, wherein the disk storage medium is an optical, rewritable disk.

11. The apparatus as claimed in claim 9, wherein third data updating the stock of data in the second data can be stored on the disk storage medium, and a third index relating to the second and third data can be written over the second index.

12. The apparatus as claimed in claim 9, which has an identification number ascertainment device for ascertaining an identification number which characterizes a property of the disk storage medium and/or the latter's relationship to the second or third data, and a comparison device for comparing the identification number with a prescribable threshold value, so that a comparison may be used to establish whether a second or third index needs to be used or a new overall index relating to all of the data stored on the disk storage medium needs to be created.

13. The apparatus as claimed in claim 12, wherein the signal processing device may be used to combine elements of the second and third indices, so that the prescribable threshold value is undershot.

14. The apparatus as claimed in claim 12, wherein the prescribable threshold value in the comparison device is in a form which is dependent on a state of the disk storage medium.

15. A disk storage medium having
first data stored thereon,
second data stored thereon which update the stock of data in the first data, and
a first index, stored thereon, relating to the first data, comprising
a second index which relates exclusively to the second data and is stored on the disk storage medium as a supplement to the first index.

16. The disk storage medium as claimed in claim 15, which is in the form of an optical, rewritable disk.

17. The disk storage medium as claimed in claim 15, wherein the second index is stored radially dose or directly next to the first index.

18. The disk storage medium as claimed in of claim 15, wherein the second index is stored in unfragmented form.

* * * * *